United States Patent [19]

De Bijl et al.

[11] Patent Number: 5,027,038
[45] Date of Patent: Jun. 25, 1991

[54] DC/AC CONVERTER FOR THE SUPPLY OF A GAS AND/OR VAPOR DISCHARGE LAMP

[75] Inventors: Andrianus M. J. De Bijl; Wilhelmus H. Iding; Bernardus J. Overgoor, all of Eindhoven, Netherlands

[73] Assignee: U. S. Philips Corporation, New York, N.Y.

[21] Appl. No.: 516,014

[22] Filed: Apr. 27, 1990

[30] Foreign Application Priority Data

Apr. 28, 1989 [NL] Netherlands .................. 8901074

[51] Int. Cl.$^5$ .................. H05B 37/02; H05B 39/04
[52] U.S. Cl. ........................... 315/209 R; 315/226; 315/241 R; 315/DIG. 5; 315/DIG. 7; 331/113 A; 363/131; 363/132
[58] Field of Search ............... 315/209 R, 189, 210, 315/217, 226, 186, 122, 132, DIG. 5, DIG. 7; 331/113 A; 363/17, 131, 132

[56] References Cited

U.S. PATENT DOCUMENTS

| 4,170,747 | 10/1979 | Holmes | 315/DIG. 7 |
|---|---|---|---|
| 4,471,269 | 9/1984 | Ganser et al. | 315/DIG. 7 |
| 4,538,093 | 8/1985 | Melai | 315/219 |
| 4,553,070 | 11/1985 | Sairanen et al. | 315/209 R |
| 4,734,624 | 3/1988 | Nagase et al. | 315/243 |
| 4,860,189 | 8/1989 | Hitchcock | 315/132 |
| 4,949,016 | 8/1990 | De Bijl et al. | 315/208 |
| 4,952,842 | 8/1990 | Bolhuis et al. | 315/226 |
| 4,965,493 | 10/1990 | Van Meurs et al. | 315/DIG. 5 |

FOREIGN PATENT DOCUMENTS 0172980  9/1984  Japan .................. 363/132

Primary Examiner—Eugene R. LaRoche
Assistant Examiner—Son Dinh
Attorney, Agent, or Firm—Bernard Franzblau

[57] ABSTRACT

A DC/AC converter for supplying two discharge lamps (12, 13). Two input terminals (4, 5) of the converter are interconnected by a series circuit comprising two switching elements (6, 7). A capacitor (8) connects one of the input terminals (4) to a common end (18) of two output circuits (17, 16, 15, 14; 23, 22, 21, 20), one of these output circuits (17, 16, 15,14) also is connected to a junction point (19) between the switching elements (6, 7). A second series circuit comprising two further switching elements (10, 11) is connected to the input terminals. The other output circuit is connected to a junction point (19$^a$) between the two further switching elements. The converter thus can be readily used both for simultaneously supplying two lamps and for supplying only one lamp.

11 Claims, 1 Drawing Sheet

DC/AC CONVERTER FOR THE SUPPLY OF A GAS AND/OR VAPOR DISCHARGE LAMP

BACKGROUND OF THE INVENTION

This invention relates to a DC/AC converter for supplying a gas and/or vapour discharge lamp. The converter comprises two input terminals which are to be connected to a DC-voltage source. These two input terminals are interconnected by a first series circuit comprising a first switching element and a second switching element, a circuit comprising a capacitor and at least two output circuits being present. The circuit comprising the capacitor is connected on the one hand to one of the input terminals and on the other hand to a first end of each of the two output circuits, and a second end of the first output circuit is connected to a junction point between the first switching element and the second switching element, while each of the output circuits is provided with connection members between which a lamp to be supplied can be connected. A is device is provided for rendering the said switching elements alternately conducting.

A known DC/AC converter of the kind indicated above has been described in, for example, U.S. Pat. No. 4,525,648 06 25, 1985). This known converter is used for supplying two lamps which are connected in parallel branches.

A drawback of this known converter is that, if one of the two switching elements becomes defective, and thus remains nonconducting, both lamps will extinguish.

SUMMARY OF THE INVENTION

The invention has for its object to provide a DC/AC converter of the kind described in the opening paragraph in which, if one of the switching elements remains non-conducting, one output circuit can still continue to function so that a lamp connected to it can continue to emit light.

According to the invention, therefore, a DC/AC converter of the kind referred to in the opening paragraph is characterized in that the input terminals are interconnected by a second series circuit comprising a third switching element and a fourth switching element, both of which are connected to the control device, a second end of the second output circuit being connected to a ]unction point between the third and fourth switching elements.

An advantage of a converter according to the invention is that, if one of the four switching elements becomes defective, and thus remains non-conductive in the operational state, one output circuit can still continue to function so that a discharge lamp connected to it can continue to emit light.

In undisturbed operating conditions of the converter, in which two lamps are supplied, the alternating character of the voltage across these lamps is obtained by having the voltage across a series circuit comprising the two output circuits change its sign continuously.

This can be explained as follows. Suppose the first and the third switching element are connected to the positive input terminal of the converter, and that the second and the fourth switching element are connected to its negative input terminal. The first and fourth switching elements will then, for example, be made conducting and non-conducting practically simultaneously by the control device. Similarly, the second and third switching elements will be made nonconducting and conducting practically simultaneously by the control device. The fact that the combination of the first and fourth switching elements on the one hand and the combination of the second and third switching elements on the other hand are made conducting at alternate moments produces the AC-voltage across the series circuit comprising the two output circuits.

It is also conceivable that while the first switching element is in the conducting state, the associated fourth switching element is made conducting and non-conducting alternately. This also holds for a few other combinations of switching elements from the first and the second series circuit of the converter.

If only one of the output circuits is provided with a correctly functioning lamp, a remaining part of the converter can function as a half-bridge circuit and thus supply the lamp.

The invention is based on the recognition of the fact that two DC/AC converters designed as half-bridge circuits can be joined together so that they have their capacitors in common.

It is conceivable for the converter according to the invention to have a second capacitor, the two capacitors forming a capacitive voltage divider which interconnects the input terminals of the converter. A junction point between these capacitors is then at the same time the first end of each of the two output circuits.

Thanks to this capacitive voltage divider, the voltages across the output circuits can remain substantially equal. This means that the lamps are operated in a unform way.

The discharge lamps to be supplied may be high-pressure discharge lamps or low-pressure discharge lamps.

The lamps may or may not be provided with preheatable electrodes.

A stabilizer ballast for such a lamp may, for example, be included in one of the supply conductors of the bridge circuit of the converter. Alternatively, a stabilizer ballast, for example a choke coil, may form a part of one of the output circuits.

Furthermore, an output circuit may be provided with a further reactive circuit element, for example a further capacitor, across which the lamp to be supplied can be connected. This reactive circuit element may serve to promote the ignition of the lamp in question.

If one of the two lamps becomes defective, and thus nonconducting, so that it extinguishes, it is possible that all four switching elements of the converter continue to be controlled by the control device The control of only two of these switching elements, however, is necessary then, i.e. of that pair of switching elements of which a junction point is connected to the second end of that output circuit to which the still operating lamp is connected. So these are the two switching elements forming part of the half-bridge circuit referred to above in the single-lamp situation.

A DC/AC converter according to the invention may be provided with a control device equipped with a light-sensitive coupling member (optocoupler), the light-sensitive part of which is aimed at one of the lamps to be supplied in operating conditions. The said coupling member is then included in the circuit in such a way that, when it is no longer illuminated - which means that the relevant lamp has extinguished - the control of that pair of switching elements of the converter which is no longer needed is blocked.

The blocking of the control action for the switching elements no longer needed is especially useful if, without blocking, the currents in the useless section of the converter circuit would rise to unacceptable levels. The blocking mechanism then provides a protection function at the same time.

In a preferred embodiment of a DC/AC converter according to the invention, the second output circuit contains, as does the first output circuit, a coil and a further capacitor. During operation of each of the output circuits the associated lamp is in series with its coil and is shunted by its further capacitor, while a junction point between the coil belonging to an output circuit and the further capacitor is connected to an auxiliary blocking device which, when activated, blocks the control of that pair of switching elements of the converter whose junction point is connected to the second end of the associated output circuit.

An advantage of the preferred embodiment is that on the one hand the ignition of the lamps can be promoted by means of the further capacitor, while on the other hand there is a considerable degree of freedom in the spatial distribution of protecting components of the converter circuit.

This preferred embodiment makes use of the fact that the inadvertent extinguishment of a lamp leads to a change in the potential of the junction point between the coil and the further capacitor of the associated output circuit.

The auxiliary blocking device may be equipped with a timer circuit for delaying the blocking moment. Thus the lamp is given sufficient time to ignite in case there is no defect.

It should be noted that a protection circuit for a DC/AC converter provided with two lamps is known per se from GB 2 131 236, FIG. 6. The operation of the protection circuit proposed therein, however, has the disadvantage that the correctly functioning lamp is also extinguished.

In a further preferred embodiment of a DC/AC converter according to the invention, the connection between the control device and those two switching elements Which belong to the same series circuit of the converter is provided with a further switch.

An advantage of this preferred embodiment is that the converter can be used for supplying either one lamp or two lamps, as desired. Since the further switch forms part of a control circuit, it need be designed for low current values only.

BRIEF DESCRIPTION OF THE DRAWING

The invention will be further explained with reference to the drawing, in which.

DESCRIPTION OF THE PREFERRED EMBODIMENTS

Figure 1:
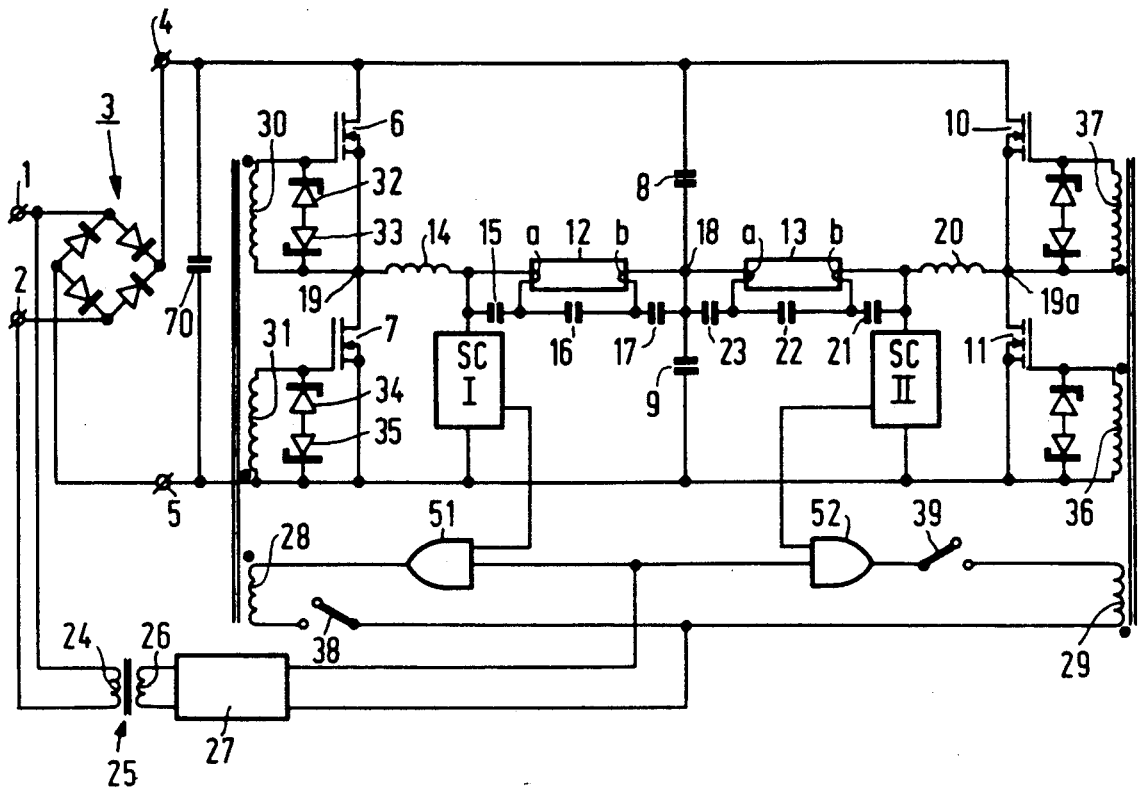
FIG. 1 shows a DC/AC converter according to the invention, to which two discharge lamps are connected. It also shows a rectifier bridge to which the input terminals of the converter are connected.

In FIG. 1, the reference numerals 1 and 2 indicate terminals to be connected to an AC-voltage source of approximately 220 volts, 50 Hz. The terminal 1 is connected to an input of a rectifier bridge 3 which comprises four diodes. The terminal 2 is connected to another input of the bridge 3. An output terminal of the rectifier bridge 3 is connected to an input terminal 4 of a DC/AC converter. Another output terminal of the rectifier bridge 3 is connected to an input terminal 5 of the converter. A capacitor 70 connects terminal 4 to the terminal 5.

In addition, the DC/AC converter comprises three circuits, each of which interconnects the input terminals 4 and 5. First of all there is a first series circuit comprising a first switching element 6 and a second switching element 7. These are semiconductor switching elements of the power MOS-FET type. Then there is a capacitive voltage divider comprising two capacitors 8 and 9, and finally a second series circuit comprising a third switching element 10 and a fourth switching element 11. The latter two switching elements are of the same type as the switching elements 6 and 7.

The converter has two output circuits. Discharge lamps 12 and 13, respectively, are connected to these output circuits during operation.

The first output circuit consists of a series circuit comprising a coil 14 and three capacitors 15, 16 and 17. The lamp 12, which is provided with preheatable electrodes $12^a$ and $12^b$, is shunted by the capacitor 16. The capacitor 15 is in parallel with the electrode $12^a$, while the capacitor 17 is in parallel with the electrode $12^b$. A first end of this first output circuit is connected to a junction point 18 between the capacitors 8 and 9. A second end of this output circuit is connected to a junction point 19 between the switching elements 6 and 7.

The second output circuit, comprising components 20 up to and including 23, is practically identical to the first output circuit. The reference numeral 20 indicates a coil, and the numbers 21, 22 and 23 each indicate a capacitor. These capacitors are connected to the lamp 13, which is provided with preheatable electrodes $13^a$ and $13^b$, in the same way as the capacitors 15 up to and including 17 are connected to the first lamp 12. On either side of both the capacitor 16 and the capacitor 17 there are connection members for the lamps 12 and 13, respectively.

A first end of the second output circuit is connected to the junction point 18 between the capacitors 8 and 9, while a second end of that output circuit is connected to a junction point $19^a$ between the third and fourth switching elements 10 and 11. So the capacitor 8 connects terminal 4 with the first ends of both output circuits.

Up to the present point the description referred to the main circuit. The control circuit will now be described below.

The connection terminals 1 and 2 are further interconnected by a primary winding 24 of a transformer 25. A secondary winding 26 of the 50 Hz transformer 25 is connected to a high-freguency oscillator 27, which acts as a control device.

Two parallel primary transformer windings 28 and 29 are connected to an output of the oscillator 27. Winding 28 is coupled to two secondary windings 30 and 31. Winding 30 connects a gate electrode of the switching element 6 to a main electrode of that switching element. The ends of the winding 30 furthermore, are interconnected by a series circuit of two oppositely arranged zener diodes 32 and 33.

A gate electrode and a main electrode of the switching element 7 are similarly connected to the winding 31. The direction of the winding 31, however, is opposite to that of the winding 30. The winding 31 is shunted by a series circuit comprising two oppositely arranged zener diodes 34 and 35.

In a similar way as indicated for the switching elements 6 and 7, the switching elements 10 and 11 are also provided with a control circuit, which in this case is supplied from the winding 29. The direction of a winding 36, which provides the control of the switching element 11, corresponds to that of the winding 30. The direction of a winding 37, which provides the control of the switching element 10, corresponds to that of the winding 31.

Figure 2:
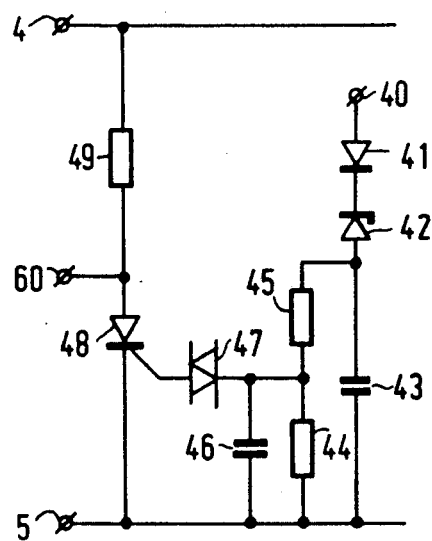
FIG. 2 of the drawing shows an embodiment of a blocking circuit which can be used in the converter shown in FIG. 1.

The connection of the control device 27 to the winding 28, furthermore, includes a switch 38 and a logic AND-gate 51. In a similar way, a switch 39 and a logic AND-gate 52 are included in the connection between control device 27 and winding 29. An input of gate 51 and an input of gate 52 are connected to an output of blocking circuit SCI and an output of blocking circuit SCII, respectively. An input of blocking circuit SCI is connected to a junction between the circuit elements 14 and 15 and an input of blocking circuit SCII is connected to a junction point between the circuit elements 20 and 21. The blocking circuit now will be described in more detail with reference to FIG. 2. The blocking circuit is an auxiliary blocking device which is provided with a timer circuit. The input 40 is connected to a series circuit comprising a diode 41, a zener diode 42 and a capacitor 43. The capacitor 43 is connected to terminal 5 at one end and is shunted by a series circuit of two resistors 44 and 45. A capacitor 46 is connected in parallel with the resistor 44. The resistor 44 and the capacitor 46 are connected at one end to terminal 5. Another end of capacitor 46 is connected to a gate electrode of a semiconductor switching element 48 via a breakdown element 47. A main electrode of this semiconductor switching element is connected to the terminal 5, while another main electrode is connected to the terminal 4 via a resistor 49. A junction point 60 between the elements 48 and 49 constitutes the output of the blocking circuit.

A protection circuit for the switching elements 10 and 11 of a similar nature is also present.

The operation of the DC/AC converter circuit described is as follows.

First the case is considered where the two lamps 12 and 13 are supplied simultaneously. For this purpose, the switches 38 and 39 are in the conducting state.

In that case the control device 27 alternately renders conducting first the first switching element 6 in conjunction with the fourth switching element 11, and then the second switching element 7 in conjunction with the third switching element 10. When the first pair of switching elements 6, 11 is conducting, the other pair of switching elements 7, 10 is non-conducting, and vice versa. As a result, an AC-voltage is applied to the series circuit comprising the two output circuits 14, 15, 16, 17 and 23, 22, 21, 20, which are provided with the lamps 12, 13. After the lamp electrodes $12^a$, $12^b$, $13^a$, $13^b$ have been preheated through the capacitors 16 and 22 respectively the two lamps 12 and 13 ignite. Should a lamp, for example lamp 12, refuse to ignite, the ensuing potential at the junction point between the coil 14 and the capacitor 15 will charge the capacitor 46 (FIG. 2) up to a potential at which the breakdown element 47 becomes conducting. This renders the semiconductor switching element 48 conducting as well, so that the potential of the junction point 60, which was identical to the potential of terminal 4 before 48 became conducting, now becomes substantially equal to the potential of terminal 5. Since one of the inputs of the logic AND-gate 51 is now "low", the same is now true for its output, and consequently there is no high-freguency voltage available anymore across the ends of the winding 28. This terminates the control of the switching elements 6 and 7.

The lamp 13 continues to burn in this case, using the half-bridge circuit 8, 9, 10, 11; 20, 21, 22, 23.

The function of the capacitors 15, 17, 21 and 23 is to insure that the blocking circuit 1 or 2 functions correctly also in case of, for example, a fracture in one of the lamp electrodes.

It is conceivable for the control device 27 to be equipped with such an auxiliary device thai a lamp starts at a different freguency from that which prevails in the operating state of that lamp.

If both lamps are correctly functioning, it is possible to use only one of them, if so desired. To this end, switch 38 or switch 39 is turned to the OFF position.

In case of defect in a switching element, for example, in switching element 10, or in its control device, resulting in that this switching element no longer becomes conducting, both lamps will not extinguish. Lamp 12 will still continue to emit light.

Unacceptable high voltages in the control circuits are prevented by the zener diodes, such as those indicated with the reference numeral 32, etc. . Unacceptable high currents in the main circuit, which would be caused by an inoperative lamp or an extinguishing lamp are eliminated vis the auxiliary blocking devices SCI and SCII.

In a practical embodiment the output freguency of the oscillator 27 was approximately 30 kHz. The capacitors 8 and 9 each had a capacitance of approximately 0.5 $\mu$F. The capacitors 16 and 22 each had a capacitance of approximately 10 nF, while the capacitors 15, 17, 23 and 21 each had a capacitance of approximately 220 nF. The coils 14 and 20 each had a value of approximately 24 mH. The lamps 12 and 13 were low-pressure mercury vapour discharge lamps of approximately 32 watts each. The oscillator 27 was an integrated circuit: SG 3524.

The DC/AC converter according to the invention, as described herein, in undisturbed operating conditions, can be used both for supplying one lamp and !or simultaneously supplying two lamps. In the latter case these lamps can be so distributed in space that their fields oppose one another, so that any radio interference caused by them can be negligibly small.

We claim:

1. A DC/AC converter for supplying a discharge lamp comprising: two input terminals for connection to a DC-voltage source, means interconnecting said two input terminals via a first series circuit comprising a first switching element and a second switching element, a capacitor and at least two output circuits means connecting the capacitor to one of the input terminals and to a first end of each of the two output circuits, a second end of the first output circuit being connected to a junction point between the first switching element and the second switching element, each of the output circuits including connection members between which a lamp to be supplied can be connected, a control device for rendering said switching elements alternately conductive, second means interconnecting the input terminals via a second series circuit comprising a third switching element and a fourth switching element each of which is connected to the control device, and means connecting a second end of the second output circuit to a junction point between the third and fourth switching elements.

2. A DC/AC converter according to claim 1, wherein the first and second output circuits each include a coil and a further capacitor connected so that in the operational state of each of the output circuits an associated lamp is connected in series with its coil and is shunted by its further capacitor, means connecting a junction point between the coil and further capacitor of each output circuit to a blocking device which, when activated, blocks the control of that pair of switching elements of the converter whose junction point is connected to the second end of the associated output circuit.

3. A DC/AC converter as claimed in claim 2, wherein a connection between the control device and the two switching elements which belong to the same series circuit of the converter includes a further switch.

4. A DC/AC converter as claimed in claim 1, wherein a connection between the control device and the two switching elements of the same series circuit of the converter includes a further switch.

5. A DC/AC converter as claimed in claim 1 further comprising a second capacitor connected between the other one of said two input terminals and said first end of the two output circuits.

6. A DC/AC converter as claimed in claim 1 wherein said control device comprises:
a high frequency oscillator having an input coupled to a source of low frequency AC voltage and an output coupled to primary winding means of a transformer, wherein said transformer includes secondary winding means coupled to control electrodes of said first, second, third and fourth switching elements, said secondary winding means being polarized so that the first and fourth switching elements are simultaneously rendered alternatively conductive and said second and third switching elements are simultaneously rendered alternately conductive in phase opposition to said first and fourth switching elements.

7. DC/AC converter as claimed in claim 1, further comprising:
first and second blocking devices having respective inputs coupled to said first and second output circuits, respectively, said first blocking device having an output coupled in circuit so as to block the operation of the first and second switching elements when the first blocking device is activated, and wherein said second blocking device has an output coupled in circuit so as to block the operation of the third and fourth switching elements when the second blocking device is activated.

8. A DC/AC converter as claimed in claim 7 further comprising:
a first switch coupled between an output of the control device and control inputs of the first and second switching elements, and
a second switch coupled between the output of the control device and control inputs of the third and fourth switching elements.

9. A DC/AC converter as claimed in claim 1 wherein said first, second, third and fourth switching elements each comprise a transistor.

10. A DC/AC converter as claimed in claim 1 wherein said first output circuit includes a series circuit of a first inducator and a first capacitive element with the first inductor in series with the discharge lamp of the first output circuit and the first capacitive element in parallel with said discharge lamp, and
said second output circuit includes a series circuit of a second inductor and a second capacitive element with the second inductor in series with the discharge lamp of the second output circuit and the second capacitive element in parallel with said discharge lamp.

11. A DC/AC converter as claimed in claim 10 further comprising:
a second capacitor connected between the other one of said two input terminals and said first end of the two output circuits thereby to form first and second half bridge DC/AC converter circuits having said first and second capacitors in common and operative so that failure of the discharge lamp in either one of said first and second output circuits does not cause the discharge lamp in the other one of the output circuits to extinguish.

* * * * *

UNITED STATES PATENT AND TRADEMARK OFFICE
CERTIFICATE OF CORRECTION

PATENT NO. : 5,027,038
DATED : June 25, 1991
INVENTOR(S) : ANDRIANUS M.J. DE BIJL ET AL It is certified that error appears in the above-identified patent and that said Letters Patent is hereby corrected as shown below:

Column 1, line 21, change "A is" to —A cintrol—;
line 26, change "06 25, 1985) to read —(06/25/1985)—.

Column 6, Claim 1, line 56, after "circuits" insert —,—.

Column 7, Claim 6, line 11, change "alternatively" to read —alternately—

Signed and Sealed this

Twenty-third Day of November, 1993

Attest:

BRUCE LEHMAN

Attesting Officer          Commissioner of Patents and Trademarks